United States Patent [19]

Ortega

[11] Patent Number: 4,781,044
[45] Date of Patent: Nov. 1, 1988

[54] SECURITY LOCK FOR VALVES

[76] Inventor: Dale R. Ortega, P.O. Box 54, Mutual, Okla. 73853

[21] Appl. No.: 8,563

[22] Filed: Jan. 29, 1987

[51] Int. Cl.⁴ ............................................. F16K 35/10
[52] U.S. Cl. ...................................... 70/177; 70/232; 70/244; 70/159
[58] Field of Search .................................. 70/175–180, 70/242–244, 229–232, 158–162

[56] References Cited

U.S. PATENT DOCUMENTS

| | | | |
|---|---|---|---|
| 206,228 | 7/1878 | Connolly | 70/180 X |
| 1,380,675 | 6/1921 | Myers | 70/178 |
| 1,400,615 | 12/1921 | McCalmont | 70/176 |
| 1,550,487 | 8/1925 | Barnes | 70/177 |
| 1,714,856 | 5/1929 | Douglas | 70/176 X |
| 1,780,994 | 11/1930 | Caldwell | 70/178 X |
| 1,944,535 | 1/1934 | White | 70/159 |
| 1,947,081 | 2/1934 | Grady et al. | 70/178 |
| 1,980,003 | 11/1934 | Schofield | 70/232 |
| 2,377,036 | 5/1945 | Quarfoot | 70/178 |
| 3,156,256 | 11/1964 | Weaver | 70/177 X |
| 3,181,523 | 5/1965 | Casey | 70/232 |
| 3,391,554 | 7/1968 | Wrenshall | 70/231 X |
| 3,406,708 | 10/1968 | Maydock | 70/177 X |
| 3,747,541 | 7/1973 | Reese | 70/230 X |
| 3,930,388 | 1/1976 | Barras | 70/159 |
| 4,208,893 | 6/1980 | Avrich et al. | 70/178 |
| 4,290,284 | 9/1981 | Nicksic | 70/230 X |
| 4,300,373 | 11/1981 | Camos et al. | 70/178 X |
| 4,406,358 | 9/1983 | Zahradnik | 70/159 X |
| 4,498,320 | 2/1985 | Mullis | 70/177 |
| 4,534,379 | 8/1985 | Burge | 70/179 X |

Primary Examiner—Gary L. Smith
Assistant Examiner—Suzanne L. Dino
Attorney, Agent, or Firm—Head & Johnson

[57] ABSTRACT

A security cover for valves used to control flow of liquids from storage vessels wherein a part of the cover interlocks with the valve stem and/or a connected valve actuating handle to prevent unauthorized use of the valve. The security cover further includes a secondary lock enclosure means, attached to the top of the cover means, which receives the lock lip means and padlock.

12 Claims, 7 Drawing Sheets

SECURITY LOCK FOR VALVES

BACKGROUND OF THE INVENTION

The invention relates to the broad field of providing security to valves that are used in particular with oil storage tanks. Such valves typically are used to control the flow of oil or other petrochemicals to the pipeline and/or other transportation systems.

SUMMARY OF THE INVENTION

The invention is directed to a lockable security cover for valves to prevent the unauthorized taking of stored liquids particularly, crude or refined oil or stored petrochemicals that would be found in remote storage vessels. In particular the apparatus is designed to prevent vandalism, theft, mistakes or accident in the loss of the contents of such storage tanks.

It is a further object of the invention to provide a locking security cover for valves wherein the locking mechanism e.g., padlock is in an inexcessible location so that it cannot be removed by the use of cutting tools.

A further object of the invention is to provide a lockable security cover for valves used with liquid storage tanks wherein means is provided to retain and secure the valve operating handle as a part of the security cover.

In particular, the lockable cover of the invention is adaptable to valves, such as a plug type valve, having a rotatable valve stem that extends through a valve bonnet which is removably secured to a valve body. The cover includes a bottom plate with suitable openings or other means to attach and affix the bottom plate to the valve between a bonnet and the valve body. The bottom plate includes upstanding vertical side walls forming a box-like enclosure, one of which side walls has a lock lip attached thereto and extending above the top of the vertical side wall. A cover plate is hingably connected to one of the side walls and has an opening therein to accommodate the top of the valve stem and/or a valve actuating handle that would be connected thereto. The opening is of size and shape such that the valve stem and valve actuating handle, if attached, cannot rotate, without the cover plate being pivoted out of the way. A lock enclosure is also attached to the top of the cover plate and has a first opening therethrough that is adapted to receive the lock lip into the lock enclosure. A second opening into the lock enclosure is provided to accommodate the attachment of a lock in and to the lock lip to prevent movement of the cover plate. As a result, movement of the valve stem and/or valve actuating handle is restrained. The second opening is of size to permit operation of a lock, yet small enough to prevent access or use of cutting tools to break the lock. Typically, the opening is no larger than a handbreadth in size.

A further extension of that object is the provision of a combined valve actuating socket tool, protective valve cover and handle therefor. In one position while the security cover is unlocked the socket tool can be attached to the valve stem to open and close same. In another position while locked in the security cover the protective cover portion will substantially cover the valve bonnet and bolts which connects the bonnet to the valve body. In this latter position the valve stem cannot be turned, yet the volt or other connecting means are inaccessible to intrusion.

DESCRIPTION OF THE PREFERRED EMBODIMENTS

Before explaining the present invention, in detail, it is to be undertsood that the invention is not limited in its application to the details of construction and arrangement of parts illustrated in the accompanied drawings, since the invention is capable of other embodiment and being practiced or carried out in a variety of ways. Also, it is to be understood that the phraseology or terminology employed herein is for the purpose of description and not of limitation.

Referring now to FIGS. 1-4 inclusive, the lockable cover of the invention is generally indicated by the numeral 20 formed of a bottom plate 22 having an opening 24 connected to flange bolt openings 26 and 28 to permit the bottom plate and the ultimate assembled cover to be attached to or between the valve bonnet and valve body. The bottom plate 22 has attached thereto a vertical upstanding sidewall 30 and rear sidewall 32 and a partial right sidewall 34. The remaining sides of the enclosure are open to permit the operation of a valve handle from a closed to opened position of the valve. A lock lip 36 is attached to the rear sidewall 32 and extending thereabove. A top cover plate 40 is hingably connected to the vertical side plate 30 in this instance by a U-shaped member 42 that is welded along each leg to the top cover 40, the bight portion thereof being pivotally secured within the sleeve 44. The top cover includes a rectangular opening 46 which is shaped, in this instance rectangular or square to accommodate the exposed valve stem. It is to be understood that this shape is only exemplary of a typical plug valve stem, the opening being of sufficient shape and size to surround the periphery of the valve stem and, when in the locked position to prevent its rotation. As described hereinafter in FIGS. 7-10 the opening is provided to surround and lock the accompanying valve socket and handle. The top cover further includes a lock enclosure 50 which is welded thereto as shown at 52. The enclosure includes a bottom opening 54 of sufficient width to receive the lock lip 36. On the rearward side thereof, an extension tab 56 or cover is provided as a means to protect the lock lip from exposure to cutting tools. An extension 58 is provided as a part of the enclosure as a means to store the lock when the cover is swung up to permit access to the operation of the valve. This could include some form of hook or opening means, for example.

The front of the enclosure is provided with a partial flange 60 along one side. Diametrically opposite thereof a threaded member 62 is welded to the housing. A dust cover 64 is provided to be pivotal at the flange 60 about a bolted connection as shown. The opposite side of the dust cover includes a hook type slot 66 for engagement with the threaded stud member 62.

Figure 1:
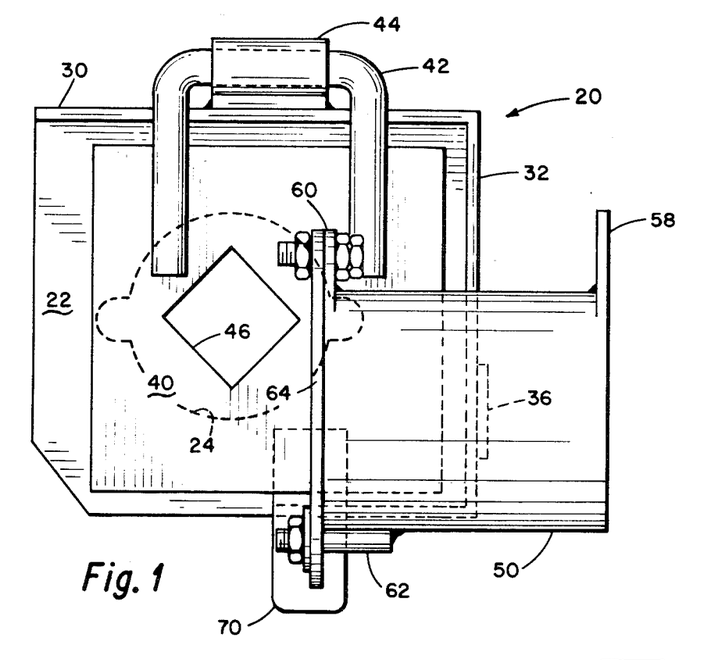
FIG. 1 is a top elevational view of the locking cover of this invention.
Figure 2:
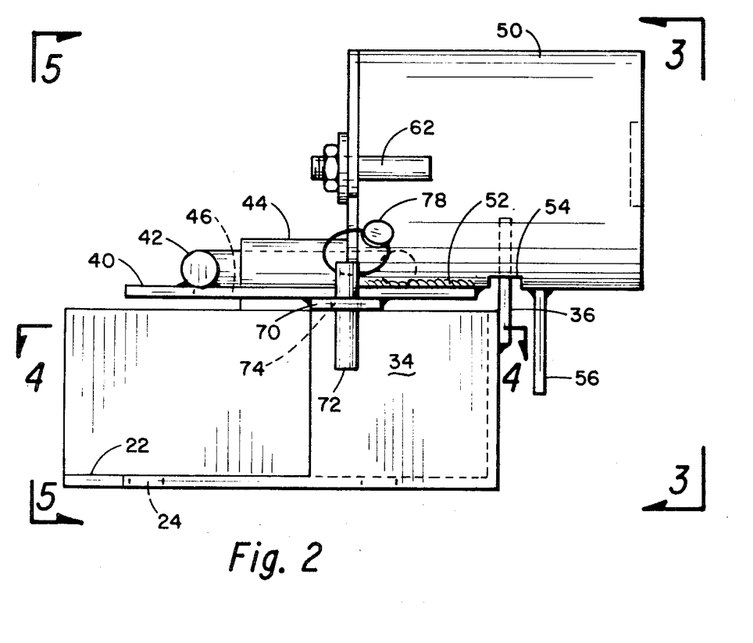
FIG. 2 is a right side elevational view of the lockable cover.
Figure 3:
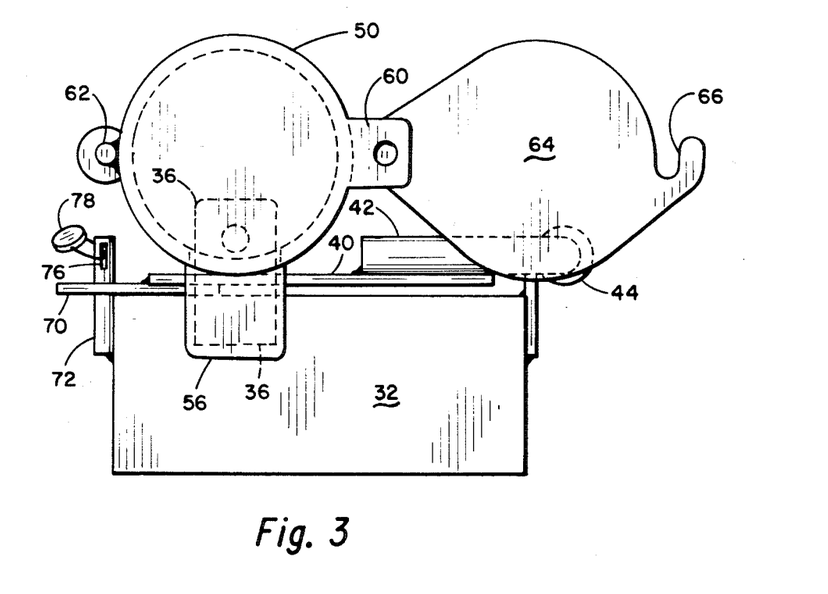
FIG. 3 is a rear side elevational view taken along the line 3—3 of FIG. 2.
Figure 4:
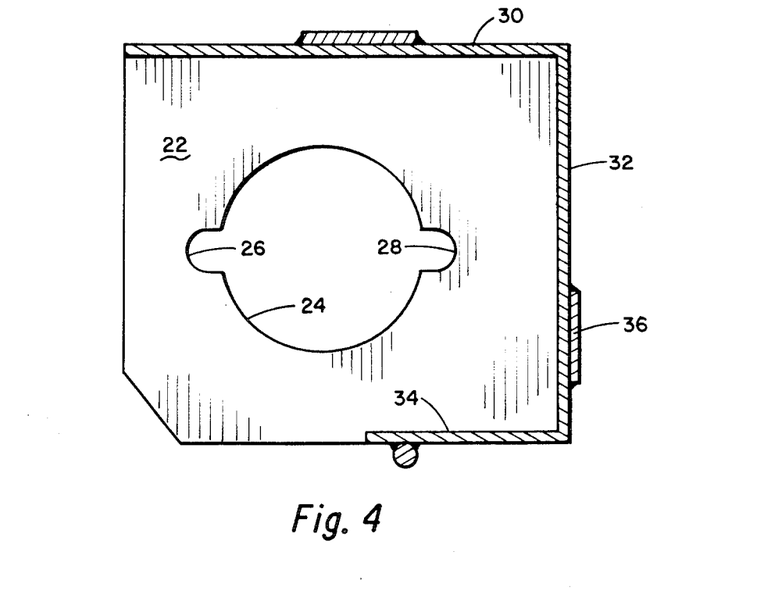
FIG. 4 is a sectional view taken along the line 4—4 of FIG. 2.

In one embodiment, a horizontal extension member 70 is formed as a part of the cover 40 and extends outwardly to rest upon the top of partial side plate 34 as shown in FIG. 2. A vertical pin 72 is welded or otherwise attached to the side plate 34 and is adaptable to extend through an opening 74. A slot 76 is provided near the top of pin 72 to receive and accept a well known type security seal 78. In the embodiment shown, it is to be understood that the vertical sidewalls such as 30, 32 and 34 can extend around the entire periphery of the bottom plate 22, especially when it is desired not to leave an actuating handle assembled to the valve as shown in FIGS. 9 and 10.

Figure 5:
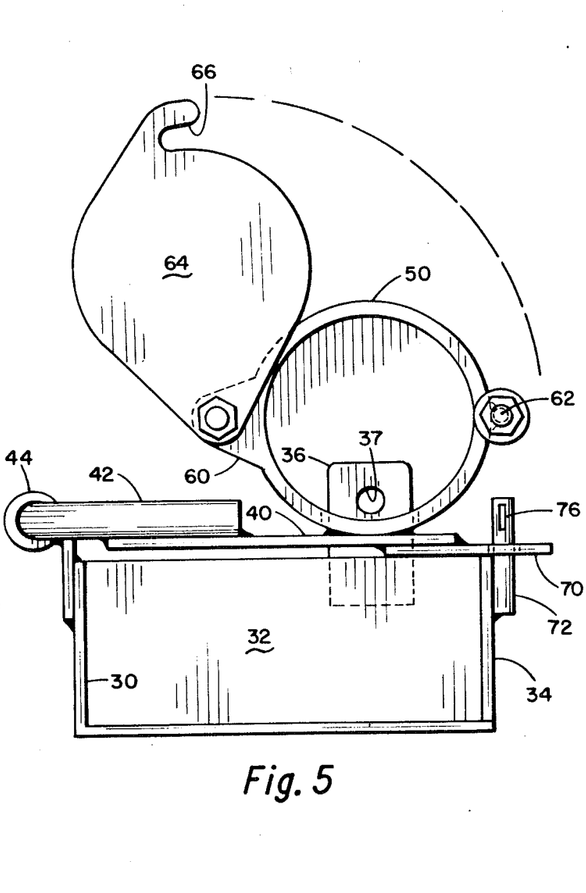
FIG. 5 is a sectional view taken along the line 5—5 of FIG. 2.
Figure 6:
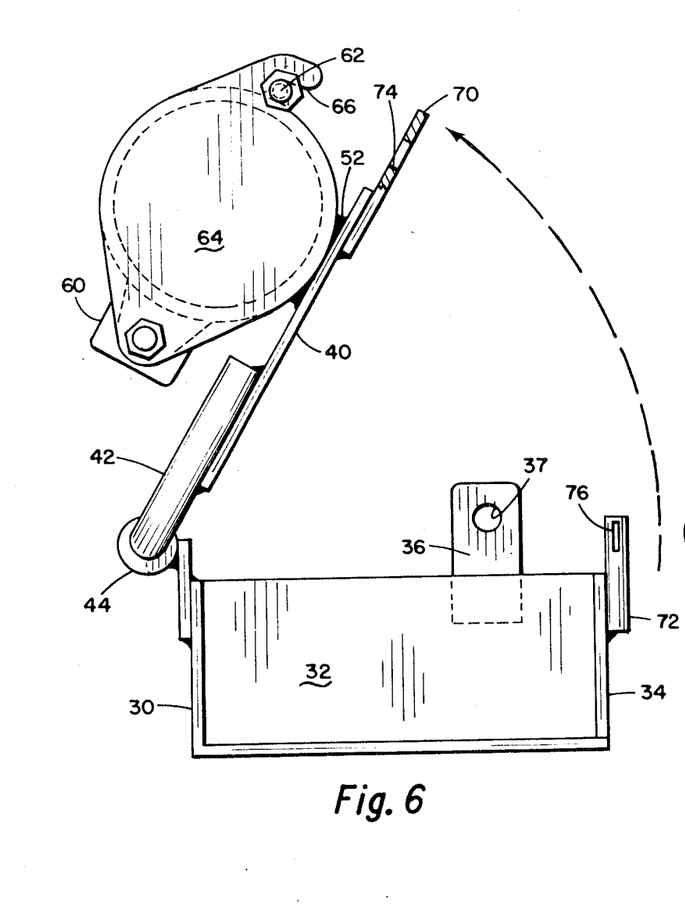
FIG. 6 is a view similar to FIG. 5 showing the operation of the hinged cover plate.

Lock lip 36 includes a means such as opening 37 to receive an ordinary padlock 100 or other lock means within the enclosure 50 and thus retain the cover plate 40 in the horizontal valve stem locked position. This is shown in FIGS. 5 and 6,.

Figure 7:
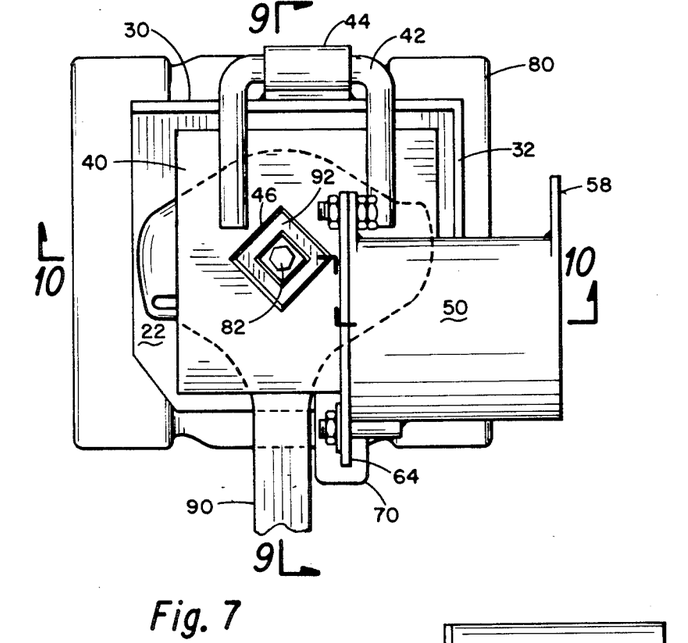
FIG. 7 is a top elevational view of the lockable cover of the invention when used in conjunction with a valve and valve handle while the valve and the locking cover are in the closed position.
Figure 8:
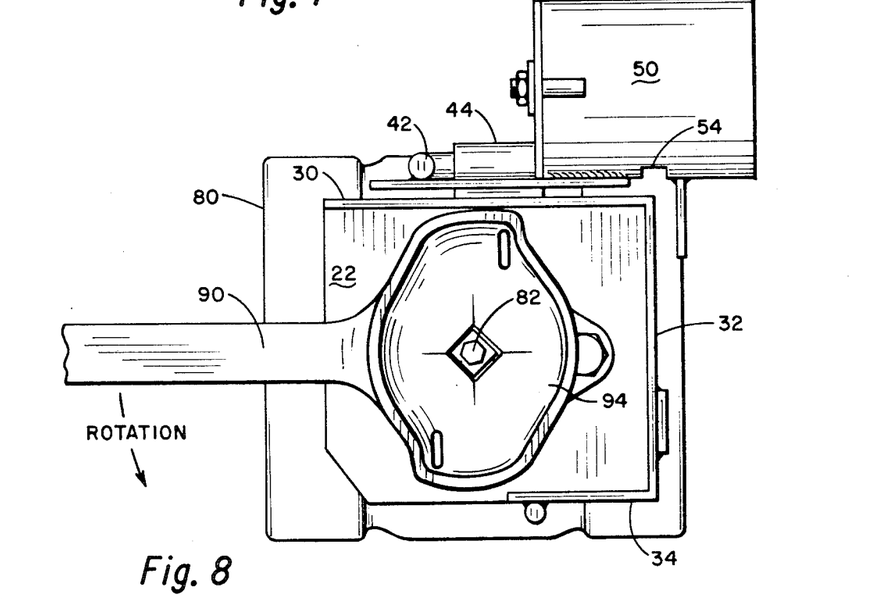
FIG. 8 is a top plan view with the top cover plate swung away and with the valve handle in the opened position.
Figure 9:
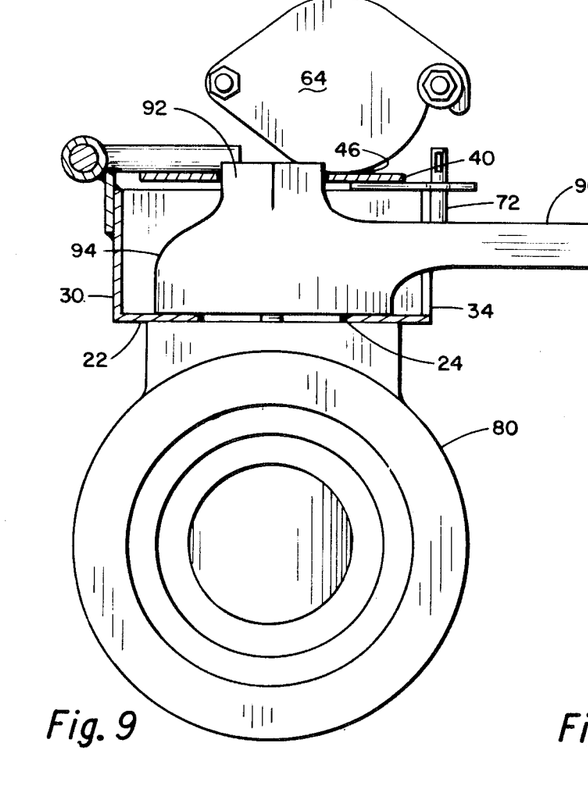
FIG. 9 is a front side elevational view, partly in cross-section taken along the line 9—9 of FIG. 7.
Figure 10:
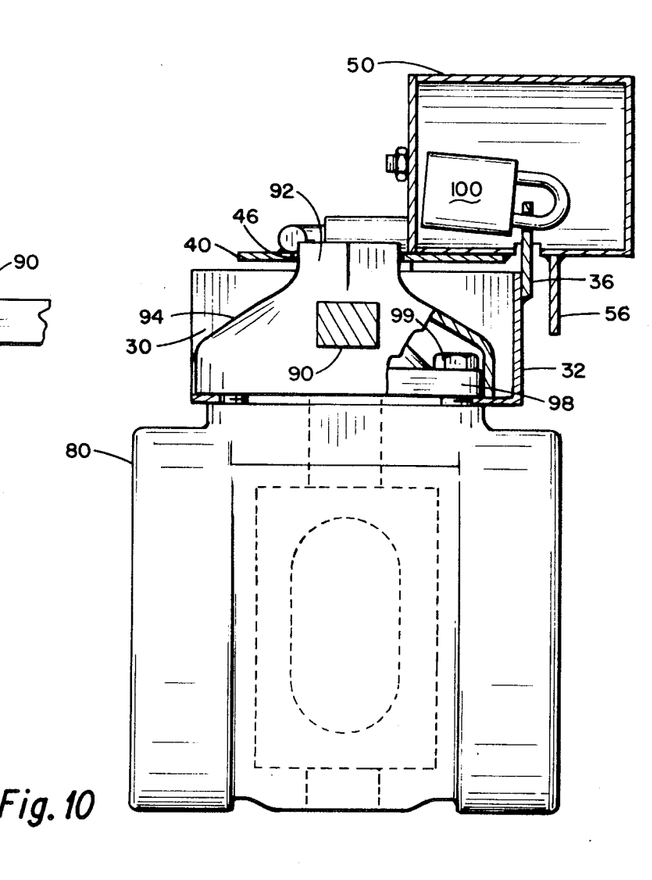
FIG. 10 is a right side elevational view of the apparatus of this invention, partly in cross-section taken along the line 10—10 of FIG. 7.
Figure 11:
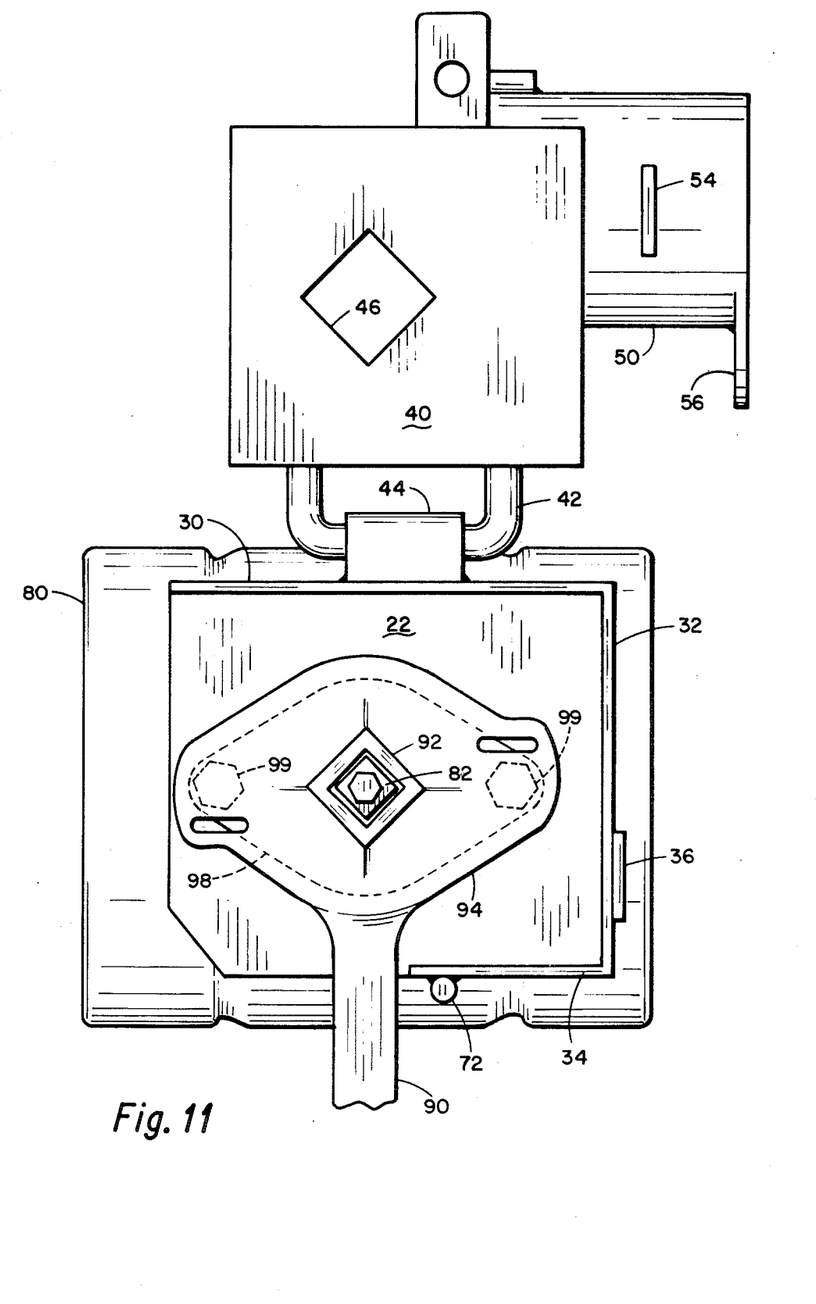
FIG. 11 is a top elevational view showing the valve handle in the locked position as per FIG. 9 with the locking cover in the open position.
Figure 12:
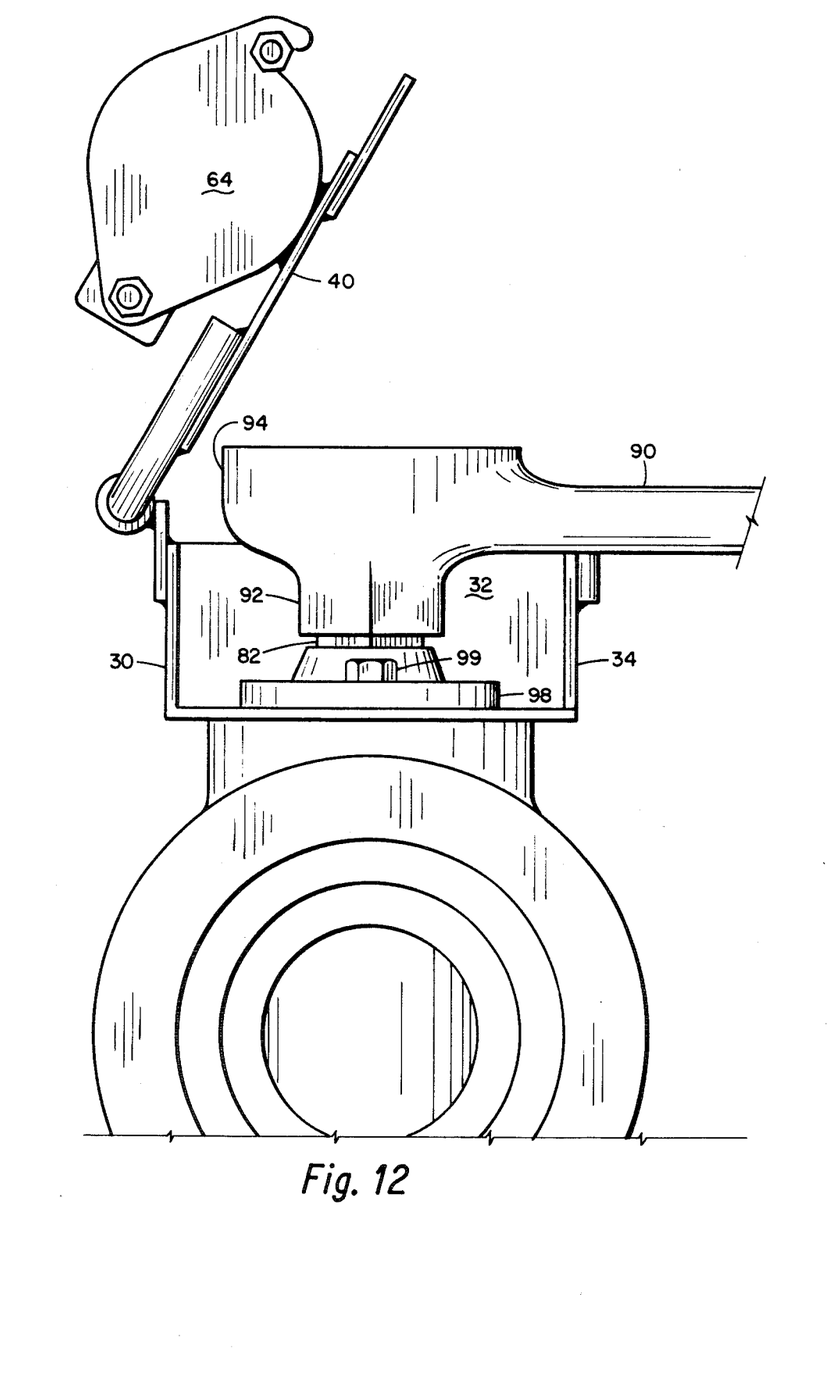
FIG. 12 is a side elevational view showing the valve handle in the operation mode with the locking cover in the open position.

FIGS. 7 through 12 show the locking cover as assembled to a typical plug valve 80 having a valve stem 82. In this embodiment, however, a valve handle 90 is shown positioned over and interlocked with the valve stem by way of a socket 92 which extends upwardly from an ovular bell shaped housing 94 formed as a part of the working end of handle 90. The bell housing 94, as shown in FIGS. 9 and 10 acts to provide a protective cover to the bolts 99 connecting the bonnet 98 with the valve body 80. In the locked position with cover 40 closed there is no access to the bolts or bonnet. As shown in FIG. 7, with the valve in the shut off position and valve handle 90 extending transversely to the flow axis of the valve, the valve stem and associated valve handle are locked or prevented from turning by the opening 46 of the cover 40. In FIG. 8 (See also FIGS. 11 and 12) once the top cover plate is swung up 90°, the valve handle can be turned over with socket 92 engaged with the valve stem free to rotate in the direction of the arrows to a fully opened position as shown and, of course, could be locked in that position by lowering the cover plate assembly and lock housing downwardly over the valve socket 92.

What is claimed is:

1. A security lock and cover for valves of the type having a rotatable valve stem extending through a valve bonnet which is attached to a valve body by a removable connector means, said cover comprising:
    a bottom plate with means to attach said bottom plate to said valve, said bottom plate having upstanding vertical sidewall cover plates on at least two sides thereof, an upwardly extending lock lip means attached to one of said vertical sidewall cover plates;
    a top cover plate means hingeably connected to one of said said sidewall cover plates substantially covering the top of said valve, an opening in said top cover plate means of the same but slightly larger shape than said valve stem, through which the top of said valve stem is received.
    a lock enclosure means attached to the top of said top cover plate means, a first opening means through said lock enclosure means to receive said lock lip means into said lock enclosure means, a second opening means into said lock enclosure means to accommodate the operation of a lock with said lock lip means to prevent the movement of said top cover plate means and said valve stem.

2. The lock and cover of claim 1 including a partial third upstanding vertical sidewall with a peripheral opening between said sidewalls to accommodate a valve actuating handle and its rotation for opening and closing said valve.

3. The lock and cover of claim 2 wherein the peripheral opening will permit rotation of at least 90°.

4. The lock and cover of claim 2 wherein said valve actuating handle comprises an enlarged opening means at one end and having a socket to receive said valve stem at the other end, the opening means of size to cover said valve bonnet and said removable connector means when positioned co-axially thereover.

5. The lock and cover of claim 4 wherein said opening in said cover plate accommodates said socket to prevent rotation of said handle when said cover plate is in a closed or lockable position.

6. A security lock and cover for valves of the type having a rotatable valve stem extending through a valve bonnet which is attached to a valve body by a removable connector means, said cover comprising:
    a bottom plate with means to attach said bottom plate to said valve, said bottom plate having upstanding vertical sidewalls on at least two sides thereof, an upwardly extending lock lip means attached to one of said vertical side walls;
    a cover plate hingeably connected to one of said sidewalls, an opening in said cover plate to accommodate the top of said valve stem, a lock enclosure means attached to the top of said cover plate, a first opening means through said lock enclosure means to receive said lock lip means into said lock enclosure means, a second opening means into said lock enclosure means to accommodate the operation of a lock with said lock lip means to prevent the movement of said cover plate and said valve stem; and
    a removable cover for said second opening of said lock enclosure means.

7. The lock and cover of claim 1 including a downwardly depending protective cover means attached to said first opening to prevent access to said lock lip when said cover plate is in a closed or lockable position.

8. The lock and cover of claim 6 including means to attach a security seal when said cover is in a closed or lockable position.

9. The lock and cover of claim 6 including a partial third upstanding vertical sidewall with a peripheral opening between said sidewalls to accommodate a valve actuating handle and its rotation for opening and closing said valve.

10. The lock and cover of claim 9 wherein the peripheral opening will permit rotation of at least 90°.

11. The lock and cover of claim 9 wherein said valve actuating handle comprises an enlarged opening means at one end and having a socket at the other end, the opening means of size to cover said valve bonnet and said removable connector means when positioned coaxially thereover.

12. The lock and cover of claim 11 wherein said opening in said cover plate accommodates said socket to prevent rotation of said handle when said cover plate is in a closed or lockable position.

* * * * *